United States Patent Office 3,709,950
Patented Jan. 9, 1973

3,709,950
MANUFACTURE OF HALOHYDROCARBONS

Ralph W. Baker, Greenwell Springs, and John H. McCarthy, Harold G. Place, and Andrew O. Wikman, Baton Rouge, La., assignors to Ethyl Corporation, New York, N.Y.

No Drawing. Continuation-in-part of applications Ser. No. 583,113, Sept. 29, 1966, now Patent No. 3,468,968, and Ser. No. 784,256, Dec. 16, 1968, now abandoned, the latter being a continuation-in-part of said application Ser. No. 583,113, which is a continuation-in-part of abandoned applications Ser. No. 127,794, Ser. No. 127,801, and Ser. No. 127,802, all July 31, 1961. This application July 28, 1969, Ser. No. 845,579

The portion of the term of the patent subsequent to Sept. 23, 1986, has been disclaimed Int. Cl. B01j 11/78; C07c 17/08
U.S. Cl. 260—659 A     3 Claims

ABSTRACT OF THE DISCLOSURE

A microspherical alumina catalyst carrier for use in an oxyhalogenation process.

RELATED APPLICATIONS

This application is a continuation-in-part of applications Ser. No. 583,113, filed Sept. 29, 1966, U.S. Pat. No. 3,468,-968, and Ser. No. 784,256, filed Dec. 16, 1968 and now abandoned; application Ser No. 784,256 is a continuation-in-part of application Ser. No. 583,113 which is a continuation-in-part of applications Ser. Nos. 127,794, 127,-801, and 127,802, all being filed July 31, 1961, and now abandoned.

BACKGROUND OF THE INVENTION

This invention relates to an improved process for the manufacture of halohydrocarbons via the oxyhalogenation of hydrocarbons. Even more particularly, it relates to an improved and durable catalyst support which favors long catalyst life by resistance of the support to degradation "fines."

Pursuant to prior art practices, unsaturated hydrocarbon compounds, for example, olefins such as ethylene, propylene, butylene and the like, can be halogenated in a cyclic halogenation process by contacting the compound with hydrogen halide and oxygen or air, in the presence of a halide of a metal possessing a variable valence. In such reactions the metal halide behaves as though it is reduced from a higher valence to a lower valence state to yield halogen atoms which saturate the double bond, or bonds, of the unsaturated compounds or substitute for hydrogen atoms attached to carbon atoms. The reduced metal halide is re-oxidized by contact with hydrogen halide and oxygen or air. A serious problem in this process concerns the production of catalyst carrier "fines" and consequent loss of the catalyst. These fines, which are very small size dust particles apparently formed by rubbing together of fluidized carrier particles, are blown from the reaction zone along with the reaction mixture and can produce serious operational difficulties. Fines tend to clog the equipment, interfere with efficiency of operations, and cause shutdowns.

It is a purpose of the present invention to reduce the foregoing and other difficulties and to advance the state of the art by providing a new and improved catalyst support for oxyhalogenation processes, and more especially the preferred ethylene oxychlorination process described hereinafter.

SUMMARY OF THE INVENTION

This invention provides an oxyhalogenation catalyst support comprising hard granular alumina microspheres and is more particularly drawn to the improvement in a catalyzed oxyhalogenation process comprising supporting the catalyst on hard granular alumina microspheres.

DESCRIPTION OF THE PREFERRED EMBODIMENTS

The foregoing and other purposes are achieved pursuant to the practice of the present invention which comprises in combination the steps of providing a catalyst support of granular alumina microspheres characterized by said support having a low surface area no greater than 300 square meters per gram, and a fluidizable particle size distribution predominantly in the range of from about 120 mesh to about 325 mesh; impregnating said support in a preferred embodiment with a catalyst in a concentration of from about 6 percent to about 15.5 percent of the total weight of catalyst and support, the catalyst consisting essentially of copper chloride, alkali metal chloride, and rare earth chlorides, said rare earth chlorides being in a concentration up to about 0.5 percent by weight of said total weight of catalyst and support; disposing the impregnated support within a reaction zone; maintaining said impregnated support in a fluidized state in the reaction zone by passing gaseous reactants therethrough comprising oxygen, hydrogen chloride, and ethylene; reacting said gaseous reactants within said reaction zone under reaction conditions including a pressure of at least about 50 pounds per square inch gauge, and a temperature maintained within the range of from about 245° C. to about 375° C. to form 1,2-dichloroethane; and removing 1,2-dichloroethane from said reaction zone.

A most preferred catalyst composition for impregnation of the low surface area granular alumina microspheres is one consisting essentially of a mixture of about 14.5 percent copper chloride, about 0.5 percent alkali metal chloride and about 0.5 percent rare earth chlorides. It is also desirable in all catalyst compositions that the alkali metal chloride be in a concentration of at least one-thirtieth of the total weight of copper chloride and alkali metal chloride.

In a highly preferred embodiment the surface area of said granular alumina microspheres is from about 1 to about 250 square meters per gram or, even more preferably, about 200 square meters per gram.

Also in a highly preferred embodiment, the objects of the present invention are more effectively achieved by maintaining the reaction temperature at from about 250° C. to about 350° C. within the reaction zone.

Thus, in a most highly preferred embodiment of the present invention a catalyst is provided which consists essentially of about 14.5 percent copper chloride, about 0.5 percent alkali metal chloride and about 0.5 percent rare earth chlorides, the catalyst being supported on alumina microspheres having a fluidizable particle size distribution predominantly within a range of from about 120 mesh to about 325 mesh and a surface area of about 200 square meters per gram; pressure is maintained at least at about 50 pounds per square inch gauge, and temperature is maintained at from about 250° C. to about 350° C.

Having thus set forth a brief description of the invention, the following is a more complete description thereof.

Pursuant to a preferred embodiment of the present invention a ternary component catalyst has been found highly suitable for an ethylene oxychlorination reaction. Specifically, a mixture of copper chloride with alkali metal chloride, and a small amount of rare earth chlorides catalyst has been found to yield extremely good results. Indeed, the better conversions resulting from the use of rare earth chlorides in the present invention more than compensates for the slight increase they necessitate in catalyst cost. Specifically, it has been found that the present invention yields vastly improved results when the catalyst is from about 6 to about 15 percent of the total weight of catalyst and support and contains from about 0.1 to about 0.5 percent of rare earth chlorides based on the total weight of catalyst and support. Also, it has been found that the alkali metal chloride may advantageously be present in the catalyst in a concentration of about 0.5 percent based on the total weight of catalyst and support. Ideally, the alkali metal chloride is in a concentration of at least one-thirtieth of the total weight of copper chloride and alkali metal chloride. An excellent catalyst composition has been found to be one consisting essentially of about 14.5 percent copper chloride, about 0.5 percent alkali metal chloride, and about 0.5 percent rare earth chlorides.

In the practice of the present invention it has been discovered that the use of a hard granular microspherical alumina having a specific range of surface area and particle size, as the carrier or support for the preferred oxychlorination catalyst above, makes it possible to conduct the oxychlorination within a fluidized bed of catalyst and sharply reduce the formation of fines that interfere with the recovery of products. In a preferred embodiment, alumina particles providing a low surface area, preferably not greater than about 300 square meters per gram, have been found highly beneficial. An even more preferable lumina is one providing surface area before impregnation with catalyst of from about 1 square meter to about 250 square meters per gram, and most preferably about 200 square meters per gram.

While the particle size of the impregnated carrier can be of any dimension which can be fluidized, it has been found highly preferable in the practice of the present invention that the size distribution be predominantly within a range of from about 120 mesh to about 325 mesh with 70 to 88 percent by weight over 400 mesh (U.S. sieve number). In other words, the preponderance of the carrier material be no coarser than about 120 mesh and no finer than about 325 mesh. Generally, it is preferred that about 60 to about 78 percent by weight of the carrier be coarser than 325 mesh, that about 2 to about 3 percent by weight of the carrier be coarser than 120 mesh, and that about 70 to about 88 percent by weight be coarser than 400 mesh. More preferred, in order to minimize fluid bed viscosity and bubble size and maximize gas-solid contact per unit volume of fluidized bed but at the same time avoid a supported catalyst so finely divided as to cause excessive elutriation loss, is a particle size distribution wherein a maximum of about 15 percent by weight of the particles are 100 microns or greater, a minimum of about 40 percent by weight and a maximum of about 60 percent by weight are 60 microns or greater, a minimum of about 80 percent by weight and a maximum of about 95 percent by weight are 30 microns or greater, and a minimum of about 95 percent by weight are 15 microns or greater.

A feature of the preferred embodiments of the present invention lies in a novel coaction between a fluidized bed and the utilization of a high pressure process. Not only does pressure have a beneficial effect on reaction equilibrium, but it also leads to other beneficial results peculiarly associated with a fluidized bed. Increased pressure in the fluidized bed results in increased efficiency of contact between catalyst and reactants, and increased efficiency of contact improves conversions. Efficiency is increased because pressure causes the reactants to contact more of the catalyst surface area. Pressure also decreases the likelihood of large bubbles of reactants passing through the fluidized bed. The net effect is an increase in productivity per unit amount of catalyst in the fluidized bed compared to lower pressure operations.

Temperature is another important variable in the practice of the preferred embodiments of the present invention. Thus, it is advantageous to utilize superatmospheric pressures while maintaining the fluidized bed at a temperature of from about 245° C. to about 375° C. Preferably, the temperature zone is maintained within a range of from about 250° C. to about 300° C. and the pressure within a range of from about 50 pounds per square inch to about 100 pounds per square inch gauge. Temperatures greater than about 375° C. are not generally used because significant oxidation of the ethylene occurs at such higher temperatures.

Other features of the present invention also contribute to the efficient practice thereof. Regulation of the superficial linear velocity of the reactant gases within certain ranges has been found to be beneficial. A superficial linear velocity of from about 0.2 ft./sec. to about 2 ft./sec. through the fluid bed is generally employed; preferably, a superficial linear velocity of from about 0.2 ft./sec. to about 1.5 ft./sec. is employed. A superficial linear velocity of from about 0.5 to about 1.2 ft. sec. has been found to provide excellent results.

Another feature of the present invention also enhances the efficient practice thereof. Thus, it has been found advantageous to regulate the feed ratios of reactants. For convenience, feed ratios are expressed in stoichiometric equivalents or stoichiometric proportions. By stoichiometric proportions is meant that, for example, in the most preferred embodiment hydrogen chloride, ethylene and air are fed into the reaction in such molar quantities that, on a theoretical basis reaction being considered as complete, sufficient air is present to provide sufficient oxygen to completely oxidize two mols of hydrogen chloride which would liberate sufficient chlorine to convert one mol of ethylene to one mole of 1,2-dichloroethane. Thus, hydrogen chloride, ethylene and oxygen combine in the molar proportions of 2:1:0.5, or where hydrogen chloride:ethylene:oxygen respectively, being 1:1:1 when expressed in stoichiometric proportions of 2:1:2.38, these ratios of hydrogen chloride:ethylene:oxygen or hydrogen chloride:ethylene:air, respectively, being 1:1:1 when expressed in stoichiometric proportions. Suitable stoichiometric equivalents of hydrogen chloride:ethylene:air for the practice of this invention may be found in the examples which follow. An ideal stoichiometric ratio of ethylene to hydrogen chloride has been found to be about 1.012 and to range from 1.0 to 1.1. An ideal stoichiometric ratio of air to hydrogen chloride has been found to be about 1.3 and to range from 1.0 to 1.5.

The following examples are typical of the conditions of operation which achieve the benefits of the present invention:

EXAMPLE I

Hydrogen chloride, ethylene and air were fed into a reaction zone at an inlet superficial linear gas velocity of one ft./sec. As expressed in ratios of percentage excess reactants (excess over stoichiometric amounts required for the oxychlorination reaction), the following stoichiometric feed ratios were maintained: ethylene to hydrogen chloride—1.012; air to hydrogen chloride—1.3. The reaction zone contained a fluidized catalytic mixture which was by weight 15.0 percent cupric chloride, 0.5 percent sodium chloride, and 0.5 percent rare earth chlorides which were obtained from monazite sand and were a mixture of the chlorides of cerium, praseodymium, neodymium, lanthanum, samarium, ytterbium, and yttrium. The catalytic mixture was deposited on microspherical granular alumina having a surface area before impregnation with catalyst of about 180 square meters per gram. The temperature within the reaction zone was maintained at 260° C. and the pressure at 100 p.s.i.g. Under these reaction conditions a productivity of 0.8 lbs. of 1,2-dichloroethane per hour per lb. of catalyst in the reactor was achieved, and the following conversions resulted:

ETHYLENE CONVERSION

| Product: | Percent converted |
|---|---|
| 1,2-dichloroethane | 94.0 |
| 1,1,2-trichloroethane | 1.4 |
| Miscellaneous chlorinated hydrocarbons | 0.4 |
| Chloral | 0.5 |
| Oxidation product (CO and $CO_2$) | 3.3 |
| Unreacted | 0.4 |
| | 100.0 |

HYDROGEN CHLORIDE CONVERSION

| Product: | Percent converted |
|---|---|
| 1,2-dichloroethane | 95.0 |
| 1,1,2-trichlorethane | 2.1 |
| Miscellaneous chlorinated hydrocarbons | 0.6 |
| Chloral | 0.7 |
| Unreacted | 1.6 |
| | 100.0 |

In each of the Examples II through IX given in Table I below a catalyst composition consisting of 14.5 weight percent cupric chloride, 0.5 weight percent sodium chloride and 0.5 weight percent rare earth chlorides, based on the total weight of catalyst plus support, was deposited upon granular type alumina microspheres providing a surface area, before impregnation with the catalytic mixture, of about 200 square meters per gram of granular alumina. The particle size distribution of the carrier, before impregnation, was such that a predominant amount of the carrier or support was within the range of 120 mesh to 325 mesh. The rare earth chlorides as in Example I were obtained by treatment of monazite sand after removal of only thorium and consisted essentially of a mixture of the chlorides of cerium, praseodymium, neodymium, lanthanum, samarium, ytterbium and yttrium. The rare earth chlorides employed in the catalytic mixture were in the same proportions, one with regard to the other, as the ratio and proportion of the rare earths to one another in the monazite sand. To a bed of this catalyst contained within a reaction zone was passed the reactants ethylene, hydrogen chloride and air at a superficial linear velocity through the zone of from about 0.6 ft./sec. to about 0.9 ft./sec., so that the catalyst in the zone was maintained in a fluidized state. The temperatures and pressures of the reactions at operating conditions were as shown. The reactants were fed continuously through the zone in the stoichiometric proportions shown.

TABLE I.—PROCESS OF THIS INVENTION—DEMONSTRATES LOW ETHYLENE OXIDATION WHEN USING LOW SURFACE AREA ALUMINA CATALYST CARRIER

| Example | Temperature (° C.) | Pressure (p.s.i.g.) | Feed (stoichiometric equivalents hydrogen Chloride: ethylene: Air) | Moles of ethylene degraded per 100 moles 1,2-dichloroethane produced |
|---|---|---|---|---|
| II | 325 | 50 | 1:0.773:1.655 | 2.22 |
| III | 325 | 50 | 1:0.917:1.12 | 0.84 |
| IV | 325 | 50 | 1:0.95:1.14 | 1.61 |
| V | 325 | 50 | 1:0.911:1.05 | 0.66 |
| VI | 325 | 75 | 1:1.03:1.057 | 1.23 |
| VII | 325 | 75 | 1:1.058:1.24 | 1.3 |
| VIII | 325 | 50 | 1:1.302:1.208 | 2.18 |
| IX | 325 | 50 | 1:1.107:1.26 | 2.18 |

EXAMPLE X

Example I is repeated except hydrogen bromide is substituted for hydrogen chloride, the catalyst is changed to 15.0 percent cupric bromide, 0.5 percent sodium bromide, and 0.5 percent rare earth bromides, and the temperature is adjusted to 280° C. Under these conditions good conversions of ethylene to 1,2-dibromoethane are obtained with low loss of support and catalyst to fines.

EXAMPLE XI

Example I is repeated except benzene is substituted for ethylene, the temperature is adjusted to 250° C. and the pressure to 50 p.s.i.g., and a ten fold stoichiometric excess of benzene relative to hydrogen chloride is employed. Monochlorobenzene and minor amounts of dichlorobenzene are obtained in good yield with good conversion of hydrogen chloride and low loss of support and catalyst to fines.

EXAMPLE XII

For purposes of attrition testing, catalyst sufficient to give about a three foot high bed was put into a vertical tube. Nitrogen at room temperature was fed into the bottom of the bed through a 1/32-inch hole to give an inlet jet velocity of approximately 530 ft./sec. against a pressure of approximately two inches Hg at the bottom of the bed. The superficial linear velocity in the bed was approximately 0.55 ft./sec. The results of this test were as follows:

TABLE II

| Carrier | A | B | C | D |
|---|---|---|---|---|
| Copper catalyst (wt. percent) | 7.64 | 10.9 | 8.06 | 9.8 |
| Starting weight (gms.) | 334 | 350 | 379 | 350 |
| Fines lost in 48 hours (gms.) | 106 | 150 | 168 | 140 |
| Percent fines lost | 31.7 | 42.8 | 44.5 | 40 |

Carrier A was the microspherical alumina carrier of the present invention. It was 99 percent alumina and had a particle density of about 1.2 to 1.3 grams per cubic centimeter, a bulk density of 50 to 60 lbs. per cubic foot, and a surface area in the range of 175 to 200 square meters per gram.

Carrier B was a commercial non-microspherical alumina. It was about 92.5 percent alumina and included silicon dioxide, iron oxide, titanium dioxide and sodium oxide. It had a packed bulk density of about 43 lbs. per cubic foot and a surface area of about 360 square meters per gram.

Carrier C was a different commercial non-microspherical alumina. It was about 96 percent alumina and included sodium oxide, iron oxide and silicon dioxide. It had a packed bulk density of 55 lbs. per cubic foot and a surface area of 100 square meters per gram.

Carrier D was also a commercial non-microspherical alumina different from Carriers A through C. It was about 92 percent alumina and included sodium oxide, iron oxide, silicon dioxide, and titanium dioxide. It had a surface area of about 210 square meters per gram and a packed bulk density of 55 lbs. per cubic foot.

From the above table it is evident that Carrier A is superior to any of Carriers B, C, or D in low loss of fines. Over a two-day period the commercial non-microspherical carriers averaged about 25 to 30 percent greater loss of fines than the alumina microspheres of the present invention.

While the catalytic mixture of this invention can be deposited upon the granular alumina in a number of different ways, a very simple and highly preferred method of impregnating the alumina is to dissolve in water a weighed amount of the components of the catalyst mixture. A weighed amount of alumina is then added to the water and the contents stirred until completely homogeneous. The water is then evaporated at low temperature from the so-formed slurry. The evaporation is conveniently done by drying in a low temperature or low temperature air circulating oven. The dry impregnated alumina remaining can then be employed in the process of this invention.

The rare earth halide component of the catalytic mixture comprises halides or oxides of one or more of any of the compounds of the rare earth group, e.g., those elements having an atomic number of from 57 through 71. The rare earth group thus includes such metals as cerium, praseodymium, neodymium, lanthanum, prometheum, samarium, europium, gadolinium, terbium, dysprosium, holmium, erbium, ytterbium, lutetium, yttrium, and the like. A highly suitable mixture of such halides is one containing halides of cerium, praseodymium, neodymium, lanthanum, samarium, ytterbium, and yttrium. Where mixtures of rare earth are employed, they can be used in any proportion, one with respect to the other, although the mixture set forth supra which is obtained from monazite sand, and in which the rare earth halides are in the same proportion as in monazite sand, is preferred.

While specific and preferred embodiments of the present invention have been described above, it is apparent that considerable variation is possible without departing from the spirit and scope of the invention. Thus, a wide variety of unsaturated hydrocarbon compounds can be utilized pursuant to the practice of this invention. Thus, any hydrocarbon compound having at least one unsaturated carbon to carbon linkage can be halogenated. Such unsaturated hydrocarbons should contain from 2 to about 20 or more or preferably 2 to about 8 carbon atoms and can be aliphatic, cyclic or aromatic and can be substituted or unsubstituted, and the unsaturation can exist anywhere in the compound. Thus, by way of illustration, olefinic compounds such as propylene, butene-2, 3-ethylene butene-1, butadiene-1,3, isoprene, 4-ethyl pentene-2, octene-1, cyclopentene, cyclohexene, 4-methyl-cyclohexene can be halogenated pursuant to the invention. Aromatic hydrocarbons such as benzene, styrene, o-, m-, p-xylene and the like can also be halogenated pursuant to this invention.

We claim:
1. In the oxychlorination of ethylene, the improvement according to which a gaseous mixture consisting essentially of air, hydrogen chloride and ethylene is passed into a fluidized bed of copper chloride oxychlorination catalyst particles on a continuous basis, the catalyst particles are hard granular alumina microspheres coated with a copper chloride oxychlorination catalyst, the microspheres having a surface area no greater than about 300 square meters per gram and ranging in size between about 120 mesh and 325 mesh, the catalyst coating being at least 6% by weight of the coated microspheres, the floating bed being maintained at a superatmospheric pressure and at an elevated temperature that causes the supplied ethylene to become continuously oxychlorinated to essentially only ethylene dichloride, and continuously removing from the fluidized bed a gas stream containing the ethylene dichloride.

2. The combination of claim 1 in which the microspheres have a surface area between about 1 and about 250 square meters per gram.

3. The combination of claim 1 in which the microspheres have a surface area of about 200 square meters per gram.

References Cited

UNITED STATES PATENTS

| | | | |
|---|---|---|---|
| 2,399,488 | 4/1946 | Hearne | 260—659 OXY |
| 2,644,846 | 7/1953 | Johnson et al. | 360—659 OXY |
| 2,994,727 | 8/1961 | Appell et al. | 260—683.2 |
| 3,114,162 | 12/1963 | Milliken | 23—215 |
| 3,256,352 | 6/1966 | Bohl et al. | 60—659 OXY |
| 3,267,162 | 8/1966 | Bohl | 260—659 OXY |
| 3,468,968 | 9/1969 | Baker et al. | 252—442 X |

CARL F. DEES, Primary Examiner

U.S. Cl. X.R.

252—442, 463